A. C. NOWLIN.
SIGN.
APPLICATION FILED SEPT 1, 1920.
1,382,311. Patented June 21, 1921.
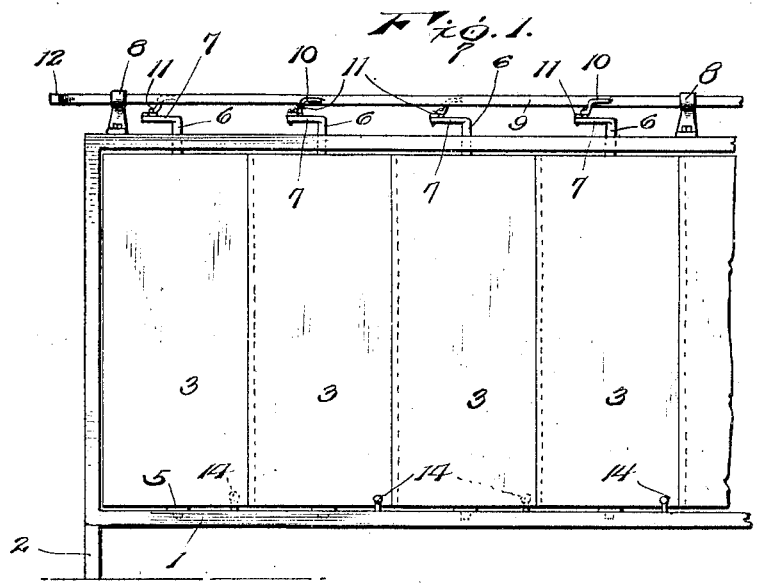
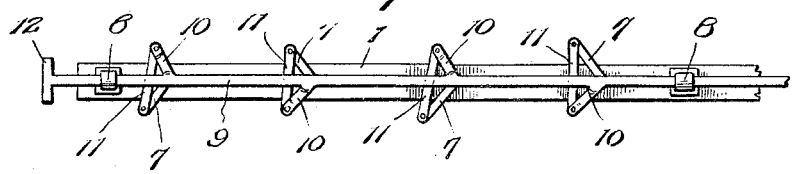
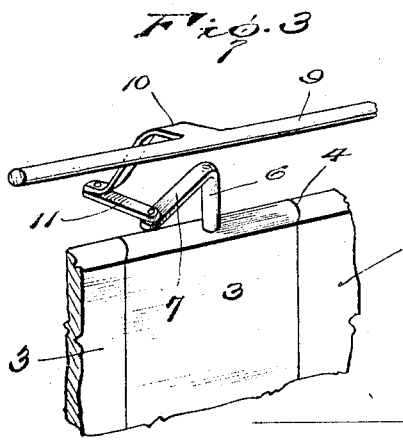
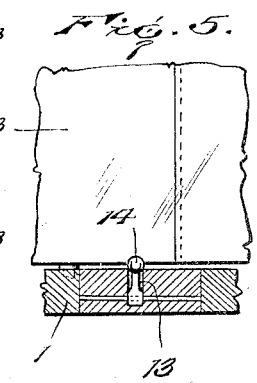
A. C. Nowlin. INVENTOR.
BY
ATTORNEYS

UNITED STATES PATENT OFFICE.

AUBREY C. NOWLIN, OF SHERMAN, TEXAS.

SIGN.

1,382,311.  Specification of Letters Patent.  Patented June 21, 1921.

Application filed September 1, 1920. Serial No. 407,388.

*To all whom it may concern:*

Be it known that I, AUBREY C. NOWLIN, a citizen of the United States, residing at Sherman, in the county of Grayson and State of Texas, have invented certain new and useful Improvements in Signs, of which the following is a specification.

This invention relates to signs, bulletin boards and other display apparatus and has for its object the provision of novel means whereby the display elements may be reversed from time to time so as to change the announcement displayed. The invention is illustrated in the accompanying drawings and will be hereinafter fully set forth.

In the drawings—

Figure 1 is an elevation of a portion of a sign embodying my improvements;

Fig. 2 is a plan view of the same;

Fig. 3 is a detail perspective view of a part of the operating mechanism;

Fig. 4 is a detail transverse section showing the stop for arresting the movement of the display panel;

Fig. 5 is a detail longitudinal section showing the stop.

In carrying out my invention, I employ a frame 1 which may be of any desired material and will preferably be supported by a plurality of feet 2 so that the lower bar of the frame will be spaced above the ground to permit the passage of wind and water. Mounted between the top and bottom bars of the frame 1 is a series of panels 3 which will preferably be rectangular so that the meeting edges of adjacent panels may fit closely together and said meeting edges are relatively convex and concave so that they will engage, as shown at 4 in Fig. 3, and thereby aid in holding the panels in alinement. This relative tongue and groove form of joint obviously should be shallow enough to permit the panels to swing freely when the sign is being reversed, but at the same time furnish a sufficiently positive engagement to hold the panels in alinement. Each panel is provided at its lower end with a trunnion or pivot pin 5 which is engaged in a socket provided therefor in the bottom bar of the frame 1 and at its upper end the panel is provided with a central pin or trunnion 6 which extends through the upper bar of the frame and is deflected laterally at its extremity to provide a crank 7, as clearly shown. Upon the top bar of the frame, I secure a plurality of bearings or guides 8 in which the operating bar 9 is slidably mounted. This bar is provided at intervals corresponding to the distance between the centers of adjacent panels with lateral arms 10 which, as shown clearly in Fig. 1, project alternately from the opposite sides of the bar and each arm 10 is connected by a link 11 with the adjacent crank 7. In the drawings, the shifting bar 9 is shown as equipped at one end with a handle 12 whereby it may be manually operated but it will, of course, be understood that the bar may be connected to any suitable time-controlled motor so that the actuation of the bar and the consequent reversal of the sign will be accomplished automatically at regular intervals.

In the lower bar of the frame, I provide a socket 13 under each panel and within said socket I pivotally mount a dog or stop 14 which projects slightly above the upper surface of the frame bar so as to engage against the face of the panel, as clearly shown in Figs. 1, 4 and 5. The stops are arranged near one vertical edge of each panel and are so disposed that when engaged by the panel the panel will be brought to rest in the longitudinal plane of the frame.

As stated and as shown in the drawings, the arms 10 on the shifting bar are disposed alternately on opposite sides of the same and project alternately in opposite directions. The stops 14 are also so disposed that the alternate stops engage opposite faces of the respective panels. If the push bar be moved to the right in the drawings, a pull will be exerted through the arms 10 and the links 11 upon the respective cranks 7 which will cause the trunnions or pivots 6 to rotate in their bearings and as these trunnions or pivots are fixed to the respective panels the panels will be swung about their own longitudinal axes and thereby reversed. It will be readily noted that the arrangement of the operating parts causes the adjacent panels to rotate in opposite directions, the panel at the extreme left in Fig. 1, for instance, turning so that its right-hand edge will move outwardly and then around to the left, receding from the stop 14, while the adjacent panel will swing in the opposite direction. The panels will obviously make one-half a complete revolution and as the half revolution is completed the face of the panel which was previously hidden will come into engagement with the stop 14 and swing the same upon its pivot until the movement is arrested by the engagement of the stop with the wall of the socket in which it is mounted whereupon the movement of the panel will cease. The stop is so located and the socket so designed that when the panel comes to rest it will be in the central longitudinal vertical plane of the frame and all the panels will be in alinement. It will be, of course, understood that each panel may carry a complete advertisement or other announcement upon each face or that the panels may each carry a part of an announcement so that the complete advertisement cannot be read while the panels are out of alinement but may be instantly and easily read when the panels come into alinement. My invention is exceedingly simple in the construction and arrangement of its parts and may be, therefore, set up at a low cost while the cost of maintenance will be negligible and the value of the device as a means for displaying advertisements or other announcements is evident.

Of course, the shifting rod is moved alternately in opposite directions, the intervals of rest between the opposite movements permitting the announcements to be read. The second movement of the shifting bar returns the panels to their initial positions.

Having thus described the invention, what is claimed as new is:

1. A sign comprising a stationary frame, a panel mounted in the frame for turning movement in a horizontal plane, and a stop pivoted in the frame for free movement in a transverse vertical plane of the frame in position to be engaged by an end of the panel.

2. In a sign, the combination of a stationary frame, a panel provided at its upper and lower ends with pivots journaled in the frame, a crank extending from the extremity of the upper pivot, a longitudinal shifting bar slidably mounted upon the frame in the vertical plane of the pivots and having a lateral arm, and a link connecting said arm with said crank.

3. The combination of a stationary frame, a plurality of panels disposed within the frame, pivots at the upper and lower ends of each panel journaled in the frame whereby to support the panels for turning movement, laterally extending cranks at the extremities of the upper pivots, a shifting bar slidably supported upon the frame, arms extending alternately in opposite directions from the said shifting bar, and links connecting said arms with the respectively adjacent cranks.

4. A sign comprising a stationary frame, a panel mounted in the frame for turning movement in a horizontal plane, a socket in the lower side of the frame, and a stop pivoted at its lower end in the base of the socket and projecting above the lower side of the frame to be engaged by the panel and swung against a side of the socket to limit the movement of the panel.

In testimony whereof I affix my signature.

AUBREY C. NOWLIN. [L. S.]